Dec. 16, 1924.
H. E. DANSTRUP
VALVE
Original Filed Oct. 11, 1922
1,519,670
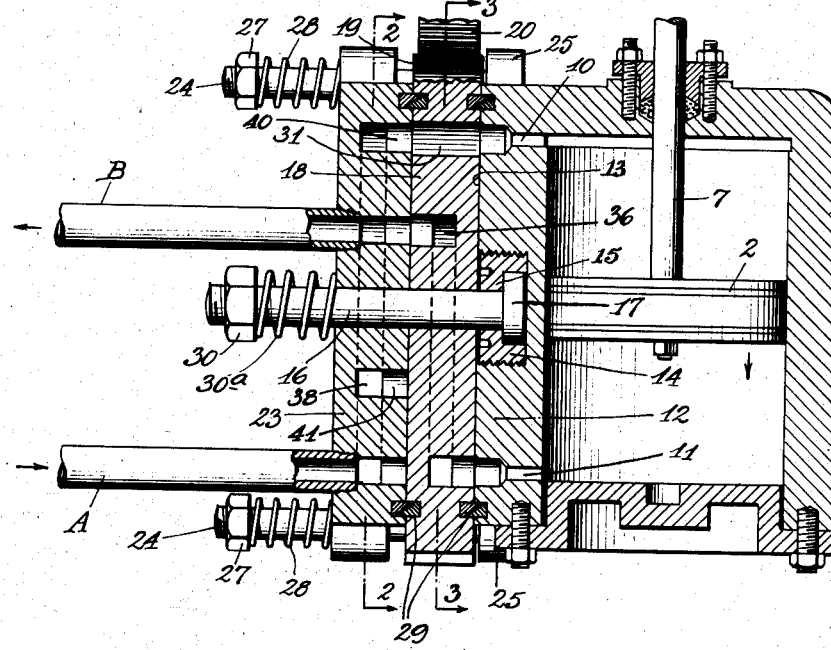
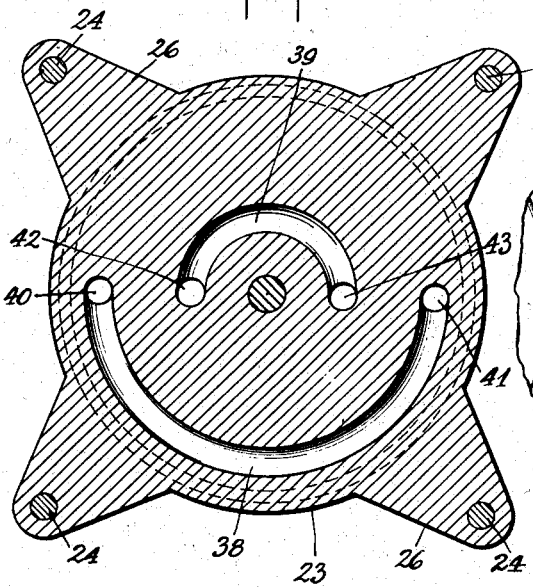
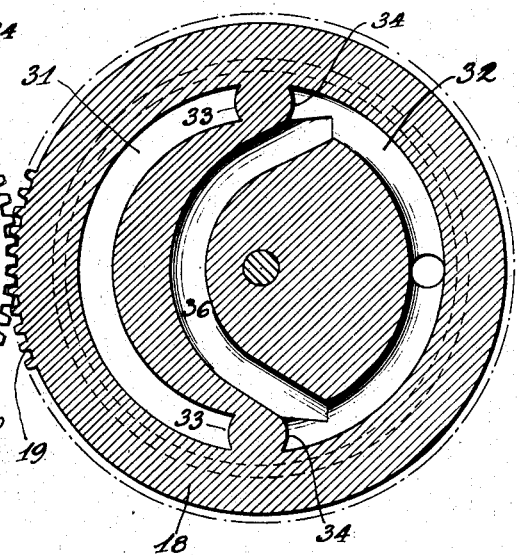
INVENTOR.
Hans E. Danstrup
BY
ATTORNEY.

Patented Dec. 16, 1924.

1,519,670

UNITED STATES PATENT OFFICE.

HANS E. DANSTRUP, OF BROOKLYN, NEW YORK, ASSIGNOR OF ONE-HALF TO JOSEPH HARRISON, OF BROOKLYN, NEW YORK.

VALVE.

Original application filed October 11, 1922, Serial No. 593,845. Divided and this application filed April 11, 1923. Serial No. 631,309.

*To all whom it may concern:*

Be it known that I, HANS E. DANSTRUP, a citizen of the United States, and resident of the borough of Brooklyn, in the county of Brooklyn and State of New York, have invented certain new and useful Improvements in Valves, of which the following is a specification.

This invention relates to revoluble valves for use in the transference of fluids to and from a cylinder as under the operation of a piston therein during the strokes thereof in opposite directions, the present application being a division of my earlier application for patent, Serial No. 593,845, filed October 11, 1922.

In the drawing:

Figure 1 is a partial horizontal sectional view of a pump with which is embodied my improved valve.

Fig. 2 is a section taken on the line 2—2 of Fig. 1, and

Fig. 3 is a section taken through the valve on the line 3—3 of Fig. 1.

My improved valve is here represented as included in the same pump organism as that forming the subject matter of my said earlier application, this showing being given merely by way of exemplifying one of the uses to which the valve may be put.

In said example let 1 indicate a pump cylinder in which is provided a piston 2 having a piston rod 7.

The cylinder is provided with the ports 10, 11 at one side thereof, these ports being disposed respectively near its opposite ends, this ported side of the cylinder being enlarged, as at 12, the enlargement having a flat outer surface 13.

An externally threaded annulus 14, having an inward flange 15, is screwed into a recess formed for its reception in the centre of enlargement 12, and a spindle 16, which has a head 17, engages thereby with the flange 15, and is extended outwardly from the annulus.

This spindle revolubly carries a valve 18 in the form of a flat disk, whose periphery is provided with gear teeth 19, which mesh with an intermediary gear 20, here shown broken away, and intended to form part of the piston operating mechanism.

A valve head 23, in the form of a flat plate is disposed at the outer side of valve 18, and is provided with a central orifice for the reception of spindle 16.

While the revoluble member 18 has been designated as the valve, actually the valve organism in this example extends also through the member referred to as the enlargement 12, and the member referred to as the valve head 23, as will become apparent in the following description of these elements of the structure. But it is proper to state, at this juncture, that the fixed member 23 bears with elastic pressure against the revoluble member 18, which similarly engages the opposed surface 13 of fixed member 12. This engagement is shown as effected by means of four bolts 24 which respectively engage the lugs 25 extended equidistantly about the member 12, and are passed freely through corresponding lugs 26 extended from member 23; the ends of these bolts having adjustment nuts 27 which retain helical springs 28 that exert suitable tension against member 23, to thereby establish and maintain the operative relation of the valve elements.

It will be appreciated that by turning the nuts 27 the tension of springs 28 may be adjusted so as to permit proper freedom of rotation for member 18.

Packing rings 29 are placed in opposed grooves in the members 12, 18 and 23 to render their working surfaces liquid tight.

Also the spindle 16 is provided with an adjustment nut 30, and a spring 30ª lies between said nut and member 23, to hold the spindle suitably adjusted, while also exerting tension centrally with respect to the assemblage of the valve elements.

By reference to Fig. 3 it will be noted that the valve element 18 is provided with an arcuate slot or clearance 31, and an opposite, arcuate passage 32, of equal extent. The end walls 33 of the slot 31 are of convex form, and likewise the ends 34 of the passage 32 have convex form.

There is also a transverse, arcuate passage 36 in element 18 which communicates respectively with the opposite ends of passage 32.

Before relating the functions of the slot 31 and passages 32, 36, it will be proper to describe the passage in member 23 which coacts therewith. Therefore, attention is directed to Fig. 2 in which will appear the outer, arcuate passage 38 and the inner, opposed arcuate passage 39.

The passage 38, at its ends, communicates respectively with the ports 40, 41; and the passage 39, at its ends communicates respectively with the ports 42, 43.

The port 40 is in fixed alignment with the port 10 in the cylinder side, and the port 41 is in alignment with the port 11, which is also located in the cylinder side.

The operation of the device will be rendered clear by reference to Fig. 1, in which piston 2 is shown as making an outstroke, during which fluid is drawn into the cylinder, behind the piston, through pipe A, passage 38, port 40, arcuate slot 31, and port 10. At the same time fluid is being expelled from cylinder 1, in advance of piston 2, through port 11, arcuate passage 32, transverse passage 36, passage 39, port 42 and out through pipe B.

The operation continues all through the out-stroke of the piston. On the return or in-stroke of the piston, or during the second half of the revolution of valve 18, when suction pull will be exerted at the forward face of the piston, the inlet will also be through pipe A, but its path will follow from port 41, through arcuate slot 31 and port 11; and at the same time fluid will be delivered from the other side of the piston, through port 10, arcuate passage 32, transverse passage 36, arcuate passage 39, and out through pipe B.

In the foregoing operations it is assumed that the crank shaft, and consequently also the valve 18 are rotated in one direction. But if the rotation of the crank shaft and valve 18 be reversed, then the inflow to the cylinder will be through pipe B and the outflow from the cylinder through pipe A, as will be apparent.

Variations within the spirit and scope of my invention are equally comprehended by the foregoing disclosure.

I claim:

1. A revoluble valve in disk-like form having an arcuate slot and on one side an opposed, arcuate passage, and a transverse passage extended between the ends of the arcuate passage.

2. A revoluble valve in disk-like form having an arcuate slot therethrough, said valve having on one side thereof an arcuate passage which is opposed to and separate from said slot, and said valve having on the same side as the arcuate passage a transverse passage which communicates with said arcuate passage near the ends of the latter.

Signed at the borough of Manhattan, in the city, county and State of New York, this 6th day of April A. D. 1923.

HANS E. DANSTRUP.